US011354327B2

(12) United States Patent
Stowe et al.

(10) Patent No.: US 11,354,327 B2
(45) Date of Patent: Jun. 7, 2022

(54) SYSTEMS AND METHODS FOR RETRIEVING AND PROCESSING DATA FOR DISPLAY

(71) Applicant: Palantir Technologies Inc., Palo Alto, CA (US)

(72) Inventors: Geoffrey Stowe, San Francisco, CA (US); John McRaven, New York, NY (US); Andrew Pettit, New York, NY (US); Lucas Lemanowicz, New York, NY (US); Benedict Cappellacci, New York, NY (US); Arjun Mathur, Stanwood, WA (US); Jonathan Victor, New York, NY (US); Nabeel Qureshi, New York, NY (US); Anshuman Prasad, New York, NY (US); Joy Tao, New York, NY (US); Mikhail Proniushkin, New York, NY (US); Casey Patton, London (GB)

(73) Assignee: Palantir Technologies Inc., Denver, CO (US)

( * ) Notice: Subject to any disclaimer, the term of this patent is extended or adjusted under 35 U.S.C. 154(b) by 76 days.

(21) Appl. No.: 16/919,951

(22) Filed: Jul. 2, 2020

(65) Prior Publication Data
US 2020/0334236 A1     Oct. 22, 2020

Related U.S. Application Data

(63) Continuation of application No. 16/720,813, filed on Dec. 19, 2019, now Pat. No. 10,740,344, which is a
(Continued)

(51) Int. Cl.
*G06F 16/248*      (2019.01)
*G06F 3/0482*     (2013.01)
(Continued)

(52) U.S. Cl.
CPC .......... *G06F 16/248* (2019.01); *G06F 3/0482* (2013.01); *G06F 16/26* (2019.01); *G06T 11/206* (2013.01); *G06T 2200/24* (2013.01)

(58) Field of Classification Search
CPC ...... G06F 16/248; G06F 3/0482; G06F 16/26; G06T 11/206; G06T 2200/24
See application file for complete search history.

(56) References Cited

U.S. PATENT DOCUMENTS 5,894,311 A  *  4/1999  Jackson .............. G06F 16/2428
                                                       345/440
7,667,582 B1 *  2/2010  Waldorf ................ G06T 11/206
                                                       340/440
(Continued)

OTHER PUBLICATIONS

Official Communication for European Patent Application No. 17209999.6 dated Jan. 21, 2020, 7 pages.
(Continued)

*Primary Examiner* — William A Beutel
(74) *Attorney, Agent, or Firm* — Knobbe Martens Olson & Bear LLP

(57) ABSTRACT

A system and method for processing data wherein one or more user selections of source data and an input defining one or more operations to be performed on the selected source data are received to generate processed data for display as a chart; the source data is retrieved from at least one data source, the source data is processed according to the defined one or more operations to generate processed data for output for display as a chart, the chart is stored as data defining the one or more operations and data identifying the source data operated on, a further user selection is received to redisplay the chart; retrieving the source data from the at least one data source; and the source data is processed according to the defined one or more operations to generate the processed data for output for redisplay as the chart.

14 Claims, 8 Drawing Sheets

Related U.S. Application Data continuation of application No. 15/852,515, filed on Dec. 22, 2017, now Pat. No. 10,552,436.

(60) Provisional application No. 62/439,793, filed on Dec. 28, 2016.

(51) Int. Cl.
*G06T 11/20* (2006.01)
*G06F 16/26* (2019.01)

(56) References Cited

U.S. PATENT DOCUMENTS

| | | |
|---|---|---|
| 10,552,436 B2 | 2/2020 | Stowe et al. |
| 10,740,344 B2 | 8/2020 | Stowe et al. |

OTHER PUBLICATIONS

Official Communication for European Patent Application No. 17209999.6 dated Mar. 12, 2021, 8 pages.

* cited by examiner

SYSTEMS AND METHODS FOR RETRIEVING AND PROCESSING DATA FOR DISPLAY

INCORPORATION BY REFERENCE TO ANY PRIORITY APPLICATIONS

This application is a continuation of U.S. patent application Ser. No. 16/720,813, filed Dec. 19, 2019, and titled "Systems and Method for Retrieving and Processing Data for Display," which application is a continuation of U.S. patent application Ser. No. 15/852,515, filed Dec. 22, 2017, and titled "Systems and Methods for Retrieving and Processing Data for Display," which application claims benefit of U.S. Provisional Patent Application No. 62/439,793, filed Dec. 28, 2016, and titled "Systems and Methods for Retrieving and Processing Data for Display," which are hereby incorporated by reference in their entirety.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and methods for retrieving data from data sources and processing the data for display in a user interface.

BACKGROUND

A database may store a large quantity of data gathered for a range of related data, which a user might want to analyze and compare to identify relationships and correlations between the data. For example, a system may comprise a large number of sensors that each collect measurements at regular intervals, and the measurements may be stored in the database and/or a system of databases. The measurement data can be supplemented with other data, such as information regarding events that occurred while the system was operational, and the supplemental data can also be stored in the database and/or the system of databases.

In some cases, a user may attempt to analyze a portion of the stored data. For example, the user may attempt to analyze a portion of the stored data that is associated with a specific time period. However, as the number of measurements increases over time, it can become very difficult for the user to identify the relevant data and perform the analysis. Also, the amount of raw data and analyzed data can become large requiring considerable data storage capabilities in the system.

SUMMARY

The systems, and methods described herein each have several aspects, no single one of which is solely responsible for its desirable attributes. Without limiting the scope of this disclosure, several non-limiting features will now be discussed briefly.

Analysts and engineers often need to analyze and view large data sets for a range of data sources. There is a need to provide a system that allows analysts and engineers to easily retrieve, process, analyze and view these large data sets.

One embodiment provides a method and system with a user interface with a data processing and analysis function that queries source data from one or more data sources and processes the data for display and analysis by one or more users accessing the system. The users can select or define one or more functions or operations to generate processed data for display. The system stores chart data comprising information on the source data and function data defining the functions or operations to be performed on the retrieved source data to generate the processed data. Unless specified by a user, the processed data is not stored and is generated each time the processed data is to be displayed using the stored from the source data. This avoids a large data storage requirement for processed data and provides the users with a system that allows flexible data manipulation analysis and display. Should users create or produce processed data that they would find value in referencing later, they could also manually select to save the processed data back with other source data. This saved processed data would then be accessible to any users with access to find the source data in the system.

In one embodiment, users can select a chart to load identified source data and process it according to the stored operation or function information in the chart data to generate the processed data and display the chart and then select to further process the data by inputting one or more operations or functions to be performed on the processed data.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

DETAILED DESCRIPTION

Figure 1:
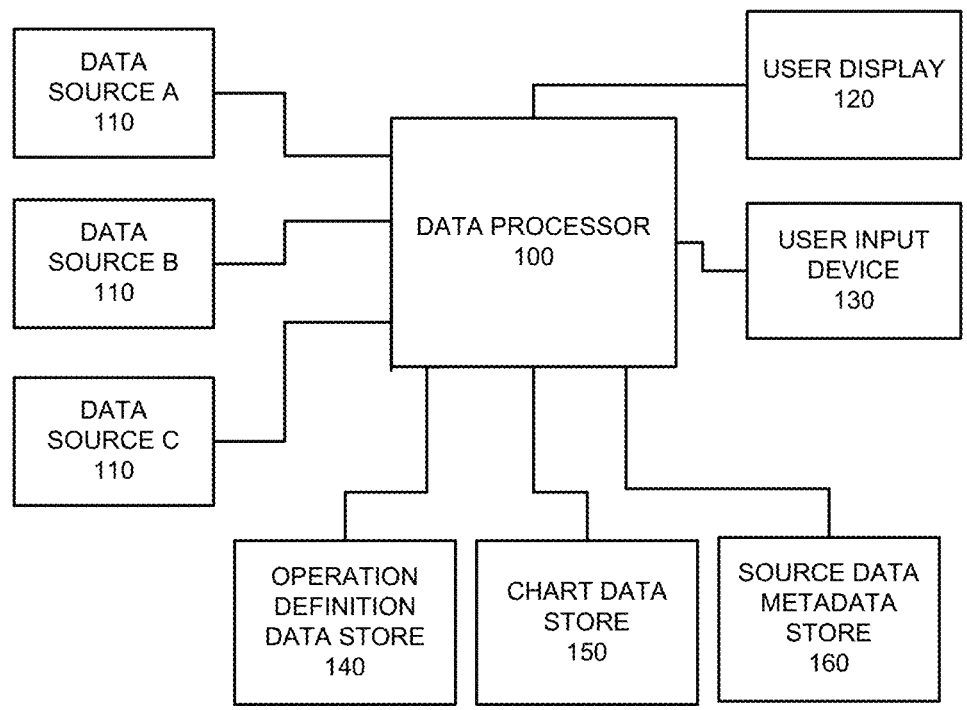
FIG. 1 is a schematic diagram of a system according to one embodiment.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store and Data Source: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. A "file system" may control how data is stored and/or retrieved (for example, a disk file system like FAT, NTFS, optical discs, etc., a flash file system, a tape file system, a database file system, a transactional file system, a network file system, etc.). For simplicity, the disclosure is described herein with respect to databases. However, the systems and techniques disclosed herein may be implemented with file systems or a combination of databases and file systems.

Referring now to FIG. 1, a system for processing data for display according to one embodiment comprises a data processor 100 for accessing data in one or more data sources 110. In FIG. 1 three data sources are shown as an example only. The data sources store source data to be accessed by a user for display and for processing to display processed data. A user input device 130 is provided to allow a user to make user selections of options and input parameters and information for use by the data processing in the processing of the source data and the processed data. A user display 120 is provided to enable a user to view displayed data in a chart generated by the data processor 100.

In this embodiment, data stores 140, 150 and 160 are provided for the data processor 100 to store parameters and information used in the processing of the source data and processed data. There is no data store provided for the storage of processed data. A source data metadata store 160 stores metadata for retrieved source data to be used in the processing of the source data and the determination of chart data for storage in a chart data store 150. Metadata for the source data can be directly read from data such as context data associated with the source data or obtained from other data sources or input by the user. The metadata can comprise information on the source data, such as name of data, units for data, scaling parameters, sampling rate, information on the origin of the data (such as the identity of the physical apparatus from which the data originated, sensor type used, geographic or logical location, date and time the data was taken etc), owner of the data (company or business name), etc.

In this embodiment, an operation definition data store 140 stores parameters defining selectable operations to be performed on retrieved source data or processed data. The operations defined can comprise any type of algorithmic or mathematical operation, such as correlation, cross-correlation, mathematical operators, such as multiplication, division addition and subtraction, unit conversion (such as from Imperial to SI units), Fourier transform, wavelet transform, linear filters, non-linear filters, algebraic functions, thresholding, interpolation, extrapolation, derivatives, differentiation, moving average, curve fitting etc. The range of operation definitions available to a user can be limited to a subset of the total dependent upon factors such as their login details or the deployment or build of the software they are implementing.

In this embodiment, the chart data store 150 is used to store data defining a derived relationship between raw source data and the target processed data. The chart data will store information identifying the source data required to be accessed and processed to determine the processed data. The identification can comprise any form of logical identifier to identify the logical location of the data. The chart data can also include constraints on the source data to be retrieved such as sampling rate or range constraints. The chart data can also include information on the form of the query required to be sent to retrieve the source data. Different data sources (e.g. databases), may require different query formats to retrieve the source data. The chart data will also include information on the transformation(s) or operation(s) to be performed on the retrieved source data. This can be by reference to the operation stored in the operation definition data store 140. A chart may require multiple sequential (or possibly parallel) operations to be performed on retrieved source data. This can be arrived at by a user selecting to further process processed data represented in a chart by selecting an operation to be performed on the data represented in the chart. The chart data will also include metadata about the chart which can at least in part be derived from the metadata for the source data. The metadata in the chart data can include any of the parameters of the metadata for the source data with additional information related to the operation result, which can include a data label, name or title, compound units, new scaling or sampling data, etc.

Figure 7:
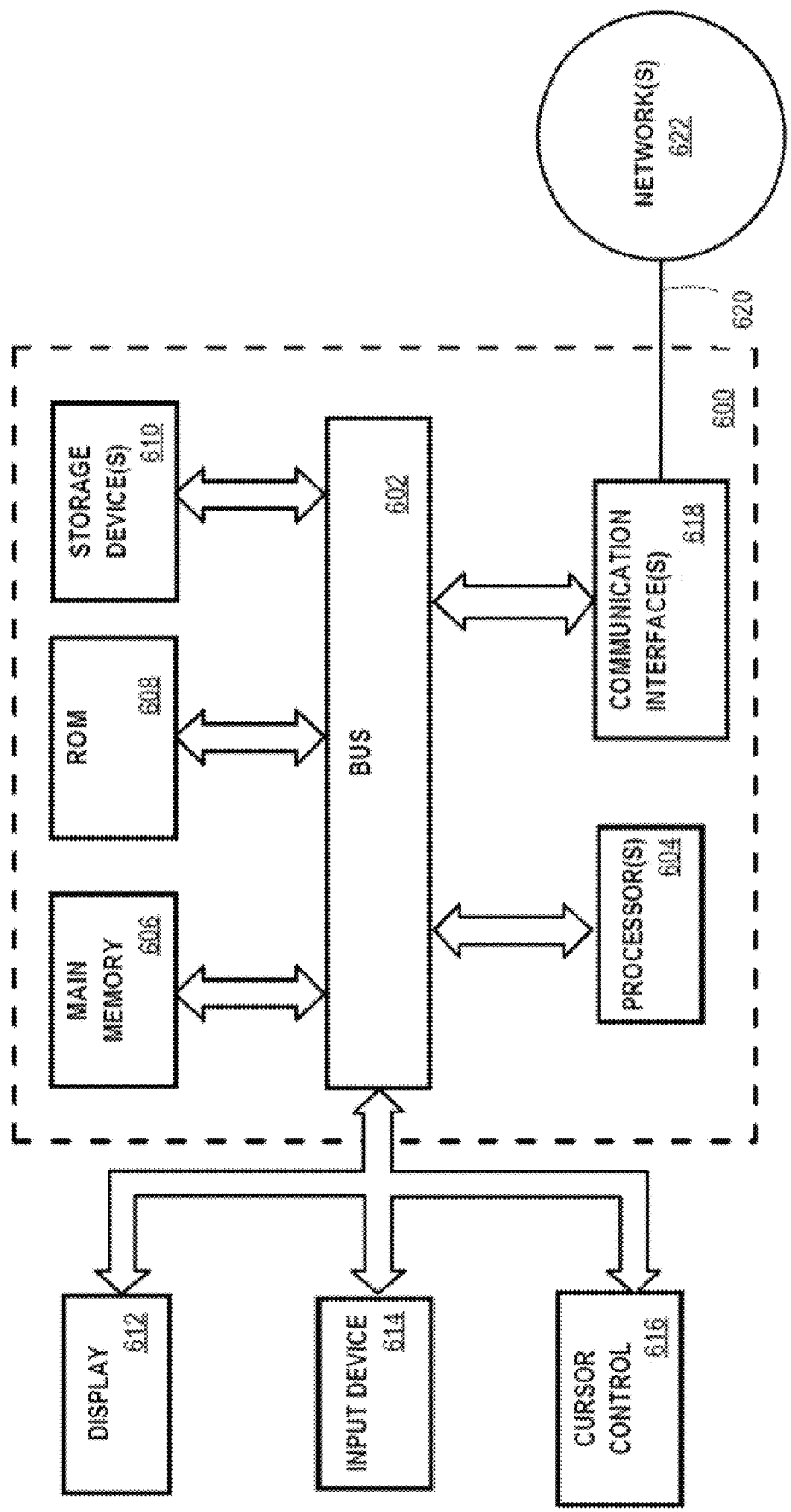
FIG. 7 is a general block diagram of a computing device according to one embodiment.

The data processor 100 may be implemented as a special-purpose computer system having logical elements, such as illustrated in FIG. 7. In an embodiment, the logical elements may comprise program instructions recorded on one or more machine-readable storage media. Alternatively, the logical elements may be implemented in hardware, firmware, or a combination thereof. In one embodiment, the data processor 100 may be implemented in a Java Virtual Machine (JVM) that is executing in a distributed or non-distributed computer system. In other embodiments, the data processor 100 may be implemented as a combination of programming instructions written in any programming language (e.g. C++, Visual Basic, Python, etc.) and hardware components (e.g., memory, CPU time) that have been allocated for executing the program instructions.

A user may use the user input device 130 and the user display 120 to view and interact with an interactive user interface generated by the data processor 100. For example, the user input device 130 and the user display may be in a user device which may be in communication with the data processor 100 via a network. The user device can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The user devices may execute a browser application to communicate with the server 140.

The data sources 110 can be provided locally with the data processor 100 or remotely connected over a network.

In an embodiment, the network includes any communications network, such as the Internet. The network may be a wired network, a wireless network, or a combination of the two. For example, network may be a local area network (LAN) and/or a wireless area network (WAN). For example, the network may include one or more firewalls and/or an endpoint server, such as a secure HTTP endpoint system.

Figure 2:
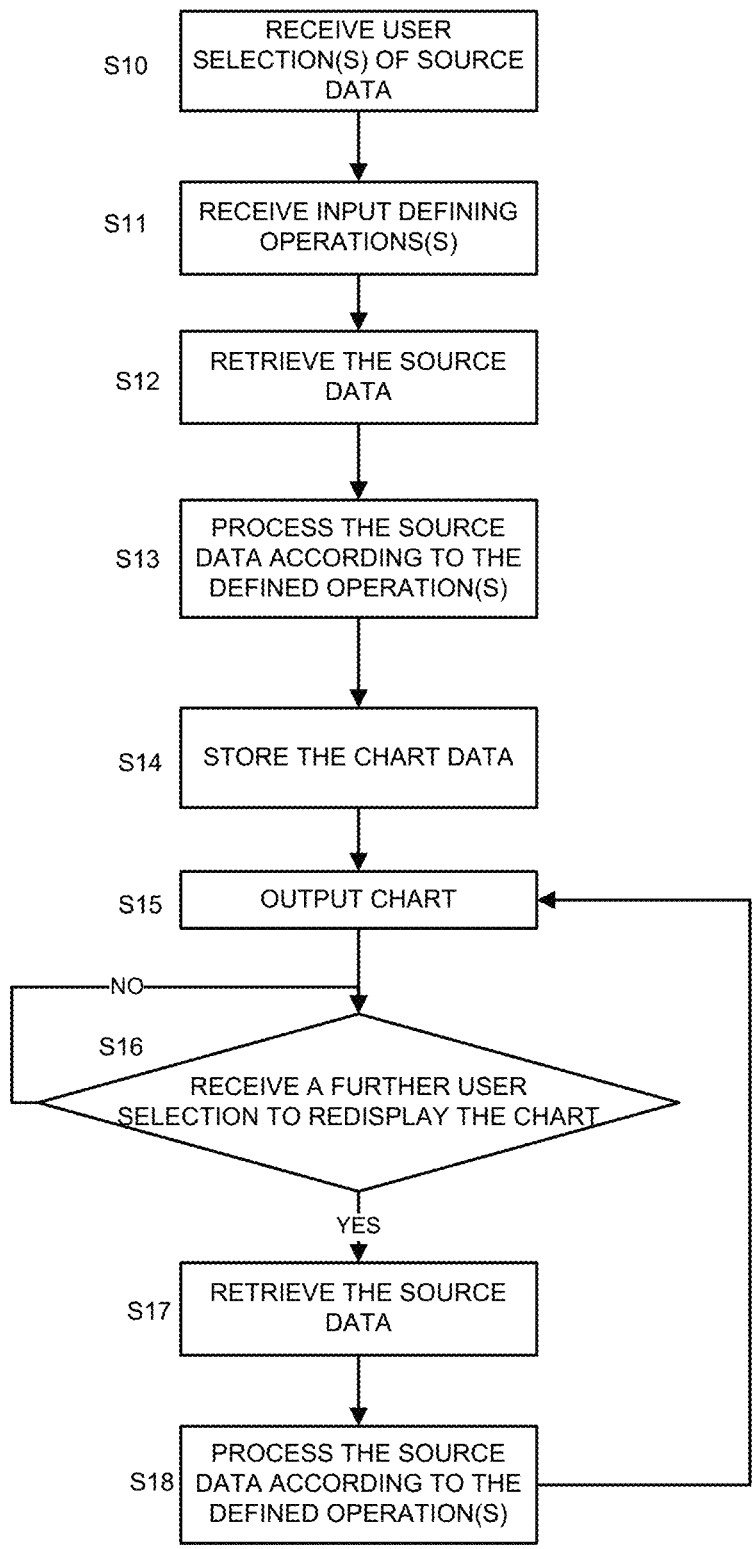
FIG. 2 is a flow diagram of a method according to one embodiment.

FIG. 2 is a flow diagram illustrating a process according to one embodiment. The figure illustrates just one embodiment and in alternative embodiments some steps are optional.

In step S10, a user selection of one or more sources of data is received and in step S11 an input defining one or more operations to be performed on the source data is received. The input can be received either as a user selection of predefined operations or by inputting information defining one or more required operations to be performed on the source data. In step S12 the source data is retrieved from the one or more data sources and in step S13 the source data is processed according to the defined operation or operations. As part of the processing, chart data is determined to include information identifying the source data required to generate the processed data for the chart, and chart data is also determined to include the definitions of the operation or operations used in the processing and metadata for the chart. The chart data is then stored in step S14 and the chart is output for display in step S15. The process then waits in step S16 to determine whether or not a further user selection is received to redisplay the chart. If a user selection is received in step S16, in step S17 the source data is retrieved from the one or more data sources and in step S18 the source data is processed according to the defined operation or operations. The process then returns to step S16 to output the chart for display. The process of receiving the further user selection to redisplay the chart allows the same user or any other user in a multiuser system to redisplay a chart that has be defined previously by another user, so long as the other user has the appropriate user access and privileges.

In this embodiment a large data storage requirement for processed data is avoided since the processed data set is not automatically stored. Instead only the data defining a chart as one or more operations and data identifying the one or many source data sets operated on is stored. This provides the users with a system that allows flexible data manipulation analysis and display with an efficient and reduced data storage requirement.

In the embodiment of FIG. 2 the processed data is not automatically stored and instead, what is automatically stored is the chart defining one or more operations and data identifying the source data operated on. In another embodiment, if a user creates or produces processed data that they or someone else would find value in referencing later, they could also manually select to save the processed data back with other source data. This saved processed data would then be accessible to any users with access to find the source data in the system.

Figure 3:
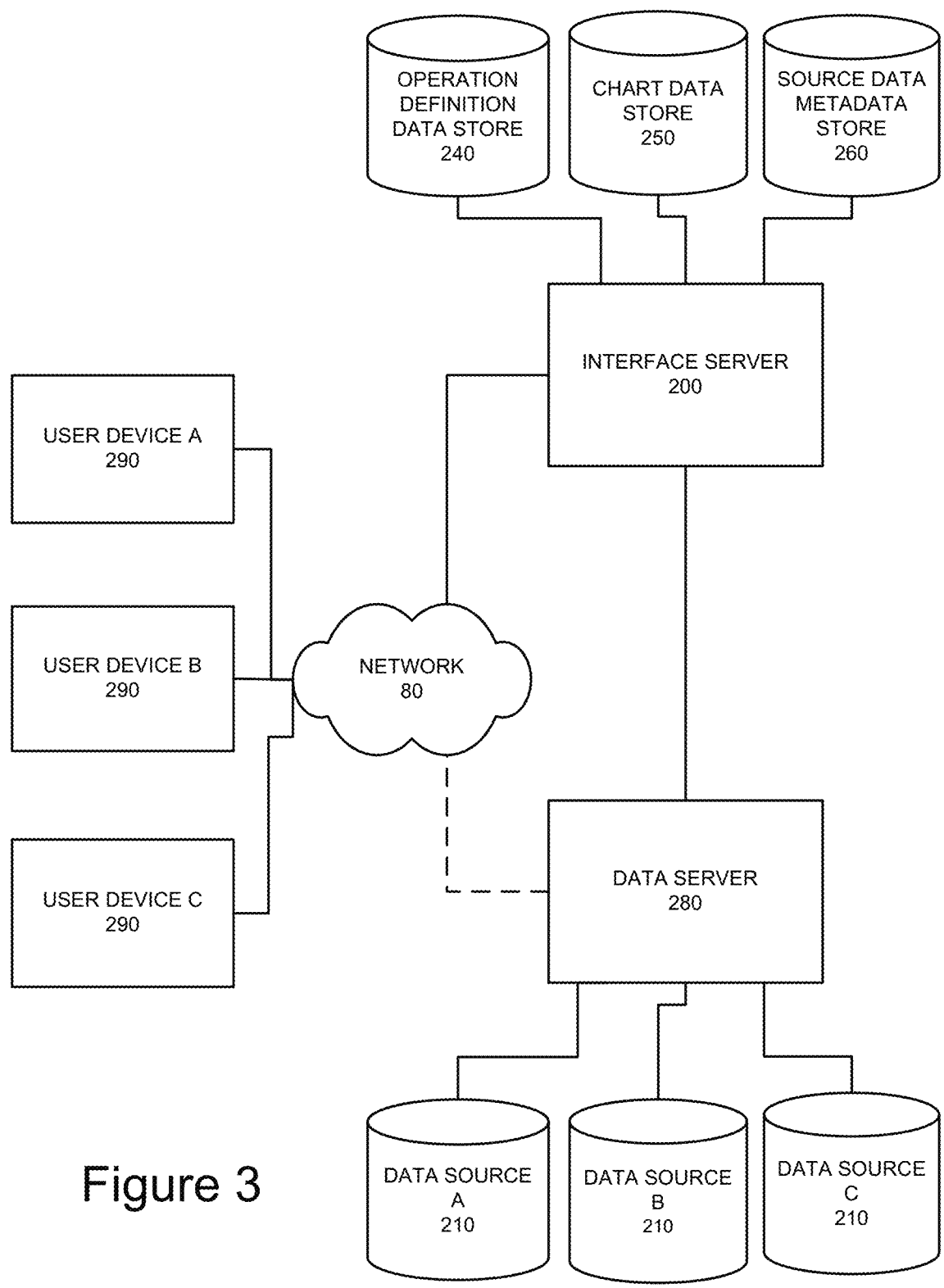
FIG. 3 is a schematic diagram of a system operating over a network according to one embodiment.

FIG. 3 illustrates an alternative embodiment implemented over a network 80. In an embodiment, the network 80 includes any communications network, such as the Internet. The network 80 may be a wired network, a wireless network, or a combination of the two. For example, network 80 may be a local area network (LAN) and/or a wireless area network (WAN). For example, the network 80 may include one or more firewalls and/or an endpoint server, such as a secure HTTP endpoint system.

Users can connect to the network to access the system using user devices 290, of which three are illustrates in FIG. 3 merely as one example. A user may use the user device 290 to view and interact with an interactive user interface generated by the interface server 200. The user device 290 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The user devices 290 may each execute a browser application to communicate with the interface server 200.

A data server 280 can be connected to the network 80 over which the user devices 290 are connected to the interface server 200, as indicated by the dotted line. In this embodiment, there is a more direct interface between the data server 280 and the interface server 200. This can be a direct connection or a connection of a separate local network.

The data server 280 is connected to one or more data sources 210 to provide access to the data sources 210. In this embodiment there are three data sources 210 illustrated, but any number may be used. Each data source 210 contains source data that a user of a user device 290 accessing the interface server 200 wants to view and analyze. The source data can comprise any type of data. In one embodiment, the data is sequential data for a plurality of associated sources. For example, the sequential data can be time sequential data, pattern sequential data, such as spatially sequential data or frequency sequential data. The source data can be obtained from many different data sources. For example, the data can be obtained from physical sensors detecting physical parameters. Alternatively the data could be determined from triggered financial parameters for example.

Figure 4:
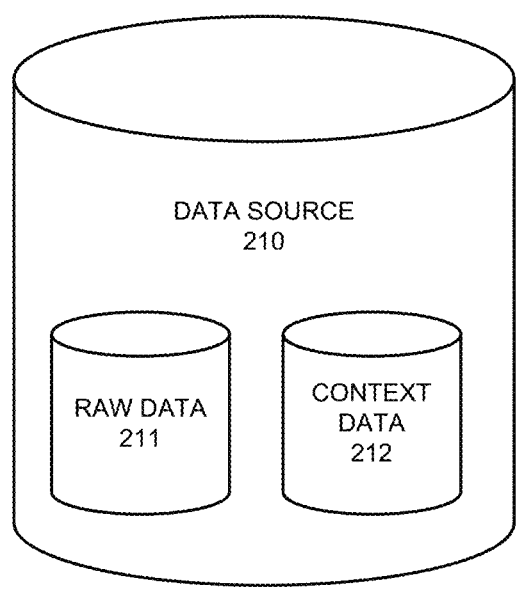
FIG. 4 is a schematic diagram of a data source according to one embodiment.

As illustrated in FIG. 4, each data source can include raw data 211 and context data 212. The context data comprises metadata for the raw data. This can include information on the raw data, such as name of data, units for data, scaling parameters, sampling rate, information on the origin of the data (such as the identity of the physical apparatus from which the data originated, sensor type used, geographic or logical location, date and time the data was taken etc), owner of the data (company or business name), etc.

Returning to FIG. 3, the interface server 200 is connected to data stores 240, 250 and 260 to store parameters and information used in the processing of the source data and processed data. There is no data store provided for the storage of processed data. A source data metadata store 260 stores metadata for retrieved source data to be used in the processing of the source data and the determination of chart data for storage in a chart data store 250. Metadata for the source data can be directly read from data such as the context data associated with the source data or obtained from other data sources or input by the user. The metadata can comprise information on the source data, such as name of data, units for data, scaling parameters, sampling rate, information on the origin of the data (such as the identity of the physical apparatus from which the data originated, sensor type used, geographic or logical location, date and time the data was taken etc), owner of the data (company or business name), events related to the data, report data and data from related sources providing context information such as ambient temperature on the day sensor measurements were taken, etc.

In this embodiment, an operation definition data store 240 stores parameters defining selectable operations to be performed on retrieved source data or processed data. The operations defined can comprise any type of algorithmic or mathematical operation, such as correlation, cross-correlation, mathematical operators, such as multiplication, division addition and subtraction, unit conversion (such as from Imperial to SI units), Fourier transform, wavelet transform, linear filters, non-linear filters, algebraic functions, thresholding, interpolation, extrapolation, derivatives, differentiation, moving average, curve fitting etc. The range of operation definitions available to a user can be limited to a subset of the total dependent upon factors such as their login details or the deployment or build of the software they are implementing.

In this embodiment, the chart data store 250 is used to store data defining a derived relationship between raw source data and the target processed data. The chart data will store information identifying the source data required to be accessed and processed to determine the processed data. The identification can comprise any form of logical identifier to identify the logical location of the data. The chart data can also include constraints on the source data to be retrieved such as sampling rate or range constraints. The chart data can also include information on the form of the query required to be sent to retrieve the source data. Different data sources (e.g. databases), may require different query formats to retrieve the source data. The chart data will also include information on the transformation(s) or operation(s) to be performed on the retrieved source data. This can be by reference to the operation stored in the operation definition data store 140. A chart may require multiple sequential (or possibly parallel) operations to be performed on retrieved source data. This can be arrived at by a user selecting to further process processed data represented in a chart by selecting an operation to be performed on the data represented in the chart. The chart data will also include metadata about the chart which can at least in part be derived from the metadata for the source data. The metadata in the chart data can include any of the parameters of the metadata for the source data with additional information related to the operation result, which can include a data label, name or title, compound units, new scaling or sampling data, etc.

The interface server 200 or the data server 280 may be implemented as a special-purpose computer system having logical elements, such as illustrated in FIG. 7. In an embodiment, the logical elements may comprise program instructions recorded on one or more machine-readable storage media. Alternatively, the logical elements may be implemented in hardware, firmware, or a combination thereof. In one embodiment, the data processor 100 may be implemented in a Java Virtual Machine (JVM) that is executing in a distributed or non-distributed computer system. In other embodiments, the data processor 100 may be implemented as a combination of programming instructions written in any programming language (e.g. C++, Visual Basic, Python, etc.) and hardware components (e.g., memory, CPU time) that have been allocated for executing the program instructions.

Figure 5:
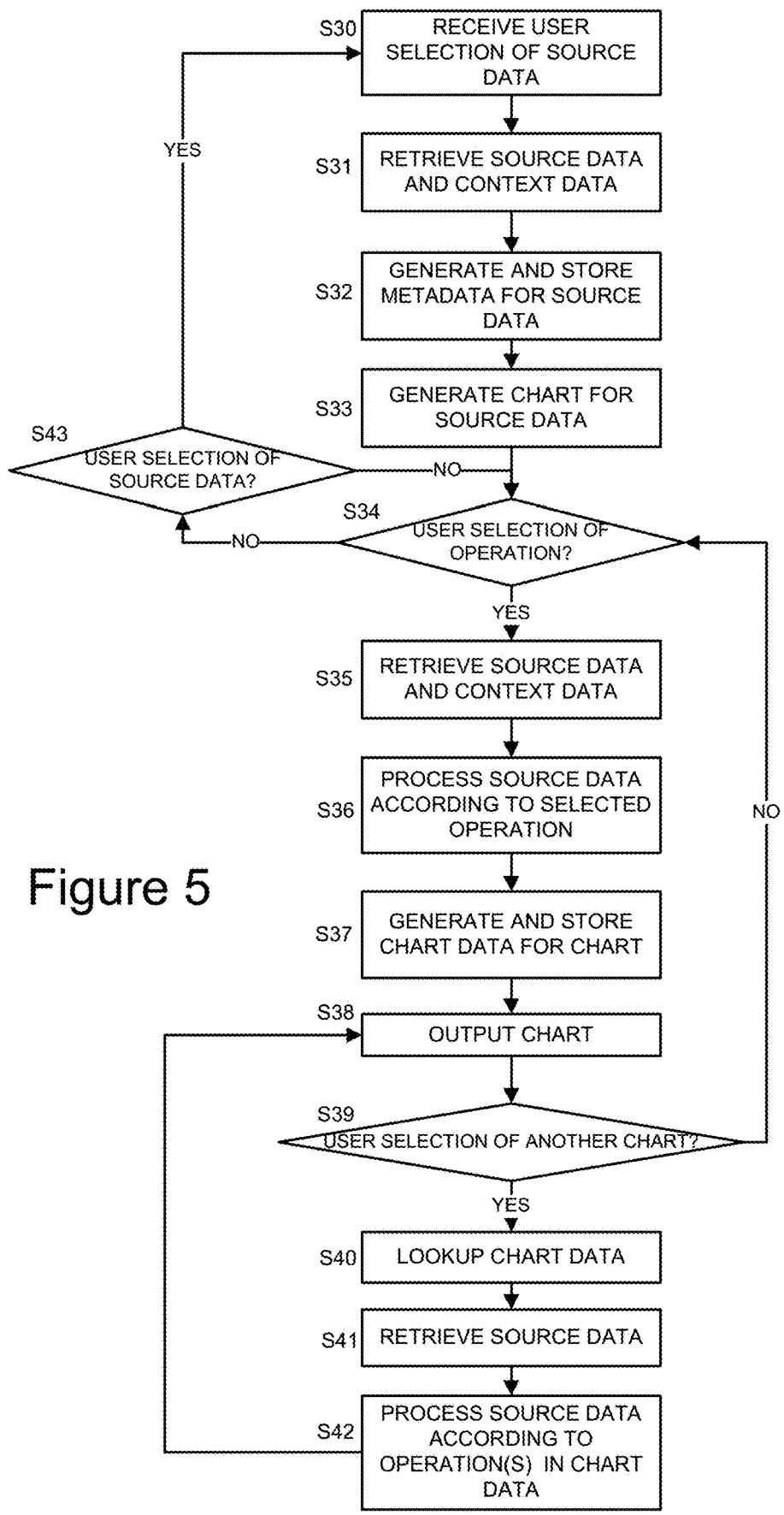
FIG. 5 is a flow diagram of a method according to one embodiment.

FIG. 5 is a flow diagram of a method using the system of FIG. 4 according to another embodiment. The figure illustrates just one embodiment and in alternative embodiments some steps are optional.

In step S30, a user selection of a source of data is received and in step S31 the source data and context data is retrieved from a data source. Metadata for the source data is then generated and stored in step S32 and in step S33 a chart for the source data is generated and output for display on a user device 290. Thus, the interface server 200 operates to serve an interface to the user devices 290 for the display of the charts at the user devices 290. The interface server 200 can for example host web pages to be accessed by a browser on the user devices 290.

The process then awaits a selection by a user of an operation from amongst a displayed list of available operations stored as definitions in the operation definition data store 240 in step S34. If no selection of an operation is received the process moves to step S43 to determine whether a user has selected another source data. If so the process returns to step S30 and if so the process returns to step S34 to await a selection.

If a user selection of an operation is received in step S34, in step S35 the source data for the displayed chart is retrieved together with the associated context data and in step S36 the source data is processed according to the selected operation. As part of the processing, chart data is determined to include information identifying the source data required to generate the processed data for the chart, and chart data is also determined to include the definitions of the operation or operations used in the processing and metadata for the chart. The chart data is then stored in step S37 and the chart is output for display in step S38. The process then waits in step S39 to determine whether or not a further user selection is received to display another chart. If a user selection is received in step S39, in step S40 the chart data is looked up for the selected chart and the source data identified in the chart data is retrieved from the one or more data sources in step S41. In step S42 the source data is processed according to the operation or operations identified in the chart data. The process then returns to step S38 to output the chart for display. The process of receiving the further user selection allows the same user or any other user in a multiuser system to redisplay a chart that has be defined previously by another user, so long as the other user has the appropriate user access and privileges.

If a user selection for another chart is not received in step S39, the process returns to step S34 to await a selection of a further operation to be carried out on the processed data represented in the displayed chart. In this way, a sequence of processing operations can be built up to be carried out on the source data. As the process cycles through the process of steps S34 to S39 multiple times, each time a chart is created based on a previous chart, another operation is added to the chart data to be performed sequentially to process the data to arrive at the latest chart. Hence, on a first cycle through steps S34 to S39 the source data is processed by one operation. On a second cycle through steps S34 to S39, the source data is first processed by the first operation in the sequence of operations in the chart data and then the processed data is further processed by a second operation in the sequence of operations in the chart data. On a third cycle through steps S34 to S39, the source data is first processed by the first operation in the sequence of operations in the chart data, then the processed data is further processed by a second operation in the sequence of operations in the chart data and then the processed data is further processed by a third operation in the sequence of operations in the chart data. This process can be repeated many times to generate the processed data required for a chart.

In this embodiment, the use of previous chart data for the processing and production of a new chart provides a simple and efficient method of generated final processed data for the desired chart. No final processed data or any intermediate processed data is automatically stored in this embodiment: only source data is stored and used for the processing. This saves storage space. In this embodiment, the operations stored as part of the chart data can be cumulatively applied starting from source data.

It can hence be seen from this that, according to an embodiment, there is no automatic storage of processed data for the charts. The chart data may store identifiers for the source data and the information on a series or sequence of one or more operations to be performed on the source data to arrive at the final processed data for a chart. This provides the users with a system that allows flexible data manipulation analysis and display with an efficient and reduced data storage requirement.

In the embodiment of FIG. 5 the processed data is not automatically stored and instead, what is automatically stored is the chart defining one or more operations and data identifying the source data operated on. In another embodiment, if a user creates or produces processed data that they or someone else would find value in referencing later, they could also manually select to save the processed data back with other source data. This saved processed data would then be accessible to any users with access to find the source data in the system.

Figure 6:
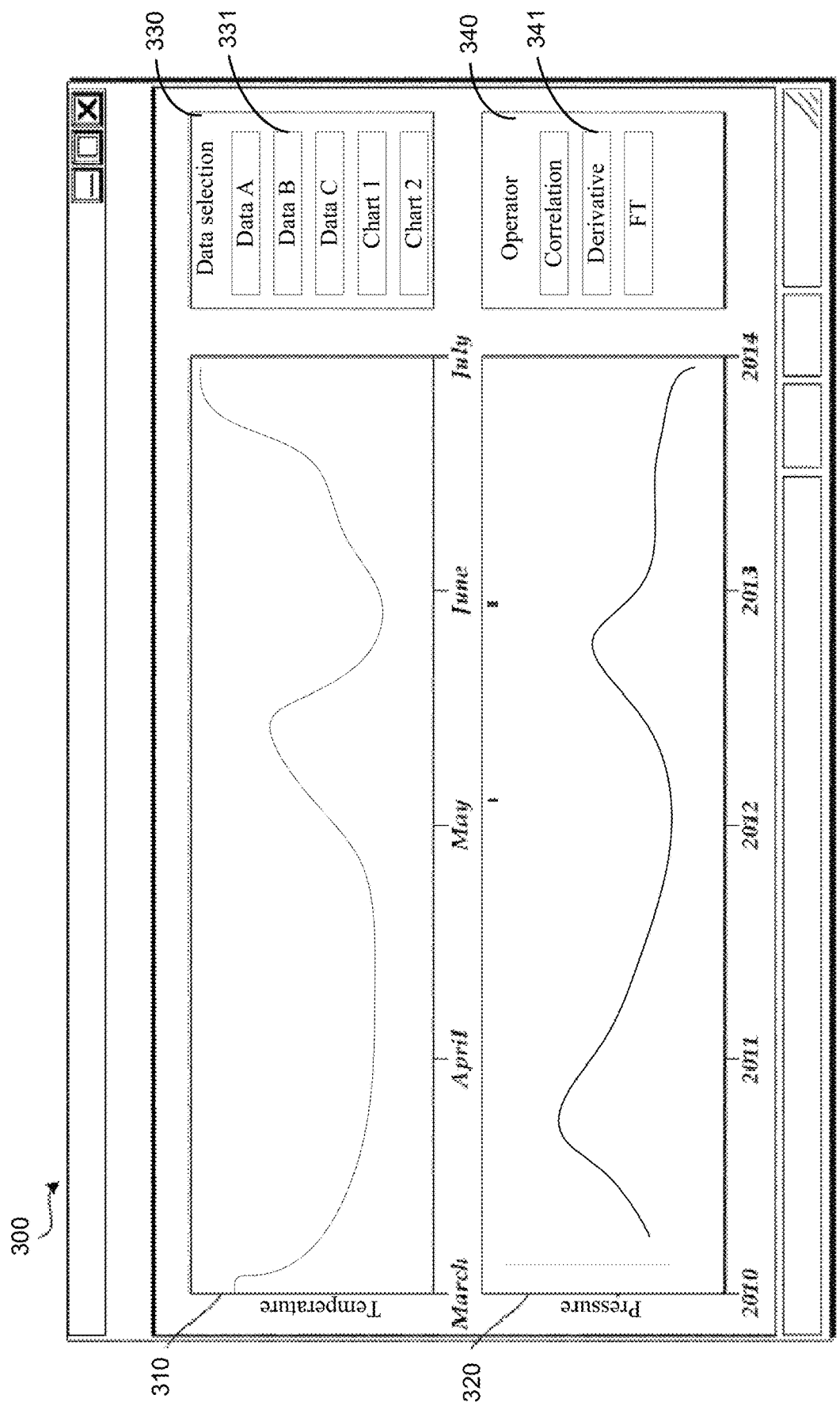
FIG. 6 illustrates a user interface displaying data to allow a user to select to generate processed data for display.

FIG. 6 is a diagram illustrating one embodiment of a user interface 300 served by the interface server 200 to the user devices 290.

In the user interface 300 one set of data is displayed as a chart 310 for temperature over a date range from March to July. The chart data for this data will hence include one or more identifiers for the source data plotted in the chart and metadata providing the information such as the chart axes units of temperature and time. Another set of data is displayed as a chart 320 for pressure over a date range from 2010 to 2014. The chart data for this data will hence include one or more identifiers for the source data plotted in the chart and metadata providing the information such as the chart axes units of pressure and time. On the right hand side of the interface 300 is displayed two selectable regions 330 and 340. In one selectable region 330 data selection options 331 are displayed. The data selection options 331 can comprise a selection of a source data for display or a selection of a previously generated chart for redisplay. In the second selectable region 340 is displayed selectable operators 341 to be used to perform operations on selected data.

FIG. 6 illustrates an interactive user interface served by the interface server 200 to the user devices 290. A user can use known selection mechanisms such as a touch screen or a pointer device to make selections from the selectable regions 330 and 340. Also, the user can make selections in the charts 310 and 320 to select regions in the charts 310 and 320 so as to select a subset of the data for use in the processing to generate a chart. For example, the user may select a reduced range such as in the time sequence e.g. the month of May in the chart 310 or the year 2013 in the chart 320. The limited range is then stored in the chart data for the new chart. It can also be used to change the request for data or the query to a database for the source data to reduce the amount of data retrieved from the data source. This reduction in data could also take the form of a request for a reduced sample rate for the data in the data source.

The interactive user interface 300 also allows a user to interact with the displayed charts 310 and 320 to perform display operations on the current charts that do not generate new charts, such as zoom, rotate, blur, stretch etc.

When a user selects to create a new chart, they can select a single chart to perform an operation on or they can select multiple charts to perform a combining operation or operations on. When more than one chart is selected, more than one set of source data required to be retrieved. If a chart representing processed data is selected to be combined by some operation with another chart representing processed data to generate processed data for a new chart, the chart data will contain information on two processes that can be carried out in parallel. For example, if chart A resulted from an operation on data A, chart B resulted in an operation on data B, and chart C is to be created as a combination of chart A and chart B (e.g. a cross-correlation operation), the chart data will store the definition on the operation on data A, the definition on data B, and the definition of a combinatorial operation on processed data A and processed data B. The processing of data A and data in the first step could be carried out in parallel.

In this embodiment, the use of previous chart data for the processing and production of a new chart provides a simple and efficient method of generated final processed data for the desired chart. No final processed data or any intermediate processed data is automatically stored by the process in this embodiment: only source data is stored and used for the processing. This saves storage space. In this embodiment, the operations stored as part of the chart data are cumulatively applied starting from source data.

In embodiments of the invention, in the processing of the chart data, the operations can be performed sequentially, in parallel, or as a combination of sequential and parallel operations. The processing of data in parallel, provides an improved speed in the processing operation to generate to final required chart data.

Example Computing Device

FIG. 7 is a block diagram that illustrates an example computing device 600 in which the example embodiment(s) of the present invention may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or other processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 7, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications. A machine-readable medium carrying instructions in the form of code can comprise a non-transient storage medium and a transmission medium.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the world wide packet data communication network now commonly referred to as the "Internet" 628. Local network(s) 622 and Internet 628 use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

Example Software System

Figure 8:
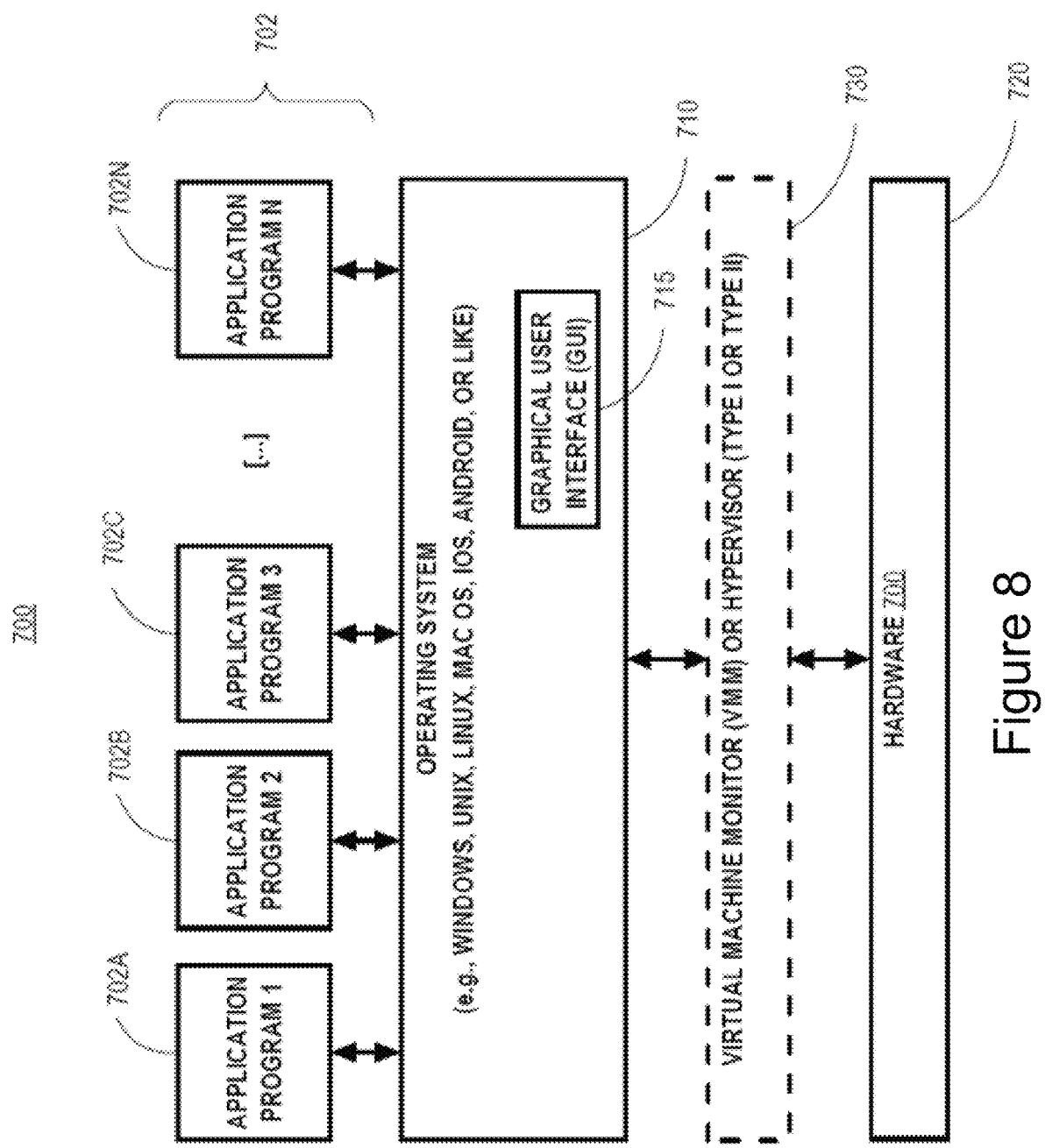
FIG. 8 is a block diagram of a basic software system for controlling the operation of the computing device according to one embodiment.

FIG. 8 is a block diagram of an example software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of device 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 600 directly. In these instances, the same Revision of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating example underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXAMPLE EMBODIMENTS

The following numbered examples are embodiments.

1. A method of processing data comprising:
at one or more machines comprising one or more processors and memory storing one or more programs executed by the one or more processors to perform the method, performing operations comprising:
receiving one or more user selections of source data and an input defining one or more operations to be performed on the selected source data to generate processed data for display as a chart;
retrieving the source data from at least one data source;
processing the source data according to the defined one or more operations to generate processed data for output for display as a chart;
storing the chart as data defining the one or more operations and data identifying the source data operated on;
receiving a further user selection to redisplay the chart;
retrieving the source data from the at least one data source; and
processing the source data according to the defined one or more operations to generate the processed data for output for redisplay as the chart.

2. The method of example 1, including receiving and storing user input chart display range data, wherein in response to receiving the further user selection the processed data is generated for output for display using the stored user input chart display range data.

3. The method of example 2, wherein the source data retrieved from the at least one source is dependent upon the user input chart display range data.

4. The method of any one of examples 1 to 3, including storing data defining a plurality of said operations, and outputting for display operation selections for the selection of the one or more operations, wherein the receiving of the input defining the one or more operations comprises receiving a selection of one or more of said operation selections.

5. The method of any one of examples 1 to 4, further comprising:
receiving a user selection of processed data displayed in one or more charts and an input defining one or more further operations to be performed on the selected processed data to generate further processed data for display as a further chart;
determining associated source data used in the determination of the further processed data, retrieving the associated source data from at least one data source;
processing the associated source data according to the defined one or more operations and the one or more further operations to generate further processed data for output for display as the further chart; and storing the further chart as data defining the one or more operations and the one or more further operations and data identifying the associated source data operated on.

6. The method of example 5, further comprising:
receiving another user selection to redisplay the further chart;
retrieving the associated source data from the at least one data source, and processing the associated source data according to the defined one or more operations and the one or more further operations to generate the further processed data for output for redisplay.

7. The method of any one of examples 1 to 6, wherein the source data comprises a plurality of sets of source data, each user selection is of a plurality of sets of source data, and the at least one defined operation comprises operating on the selected sets of source data in combination to generate the new data.

8. The method of any one of examples 1 to 7, including storing metadata on the source data, wherein the chart is stored to further include metadata on the processed data.

9. The method of any one of examples 1 to 8, wherein the source data is sequential data.

10. The method of any one of examples 1 to 9, wherein the retrieving of the source data from the at least one data source includes automatically receiving updated source data, and the processing of the source data according to the defined one or more operations to generate the processed data for output for display automatically updates the processed data according to the updated source data.

11. A system for processing data comprising:
a data store;
memory storing program code; and
one or more processors for executing the program code to:
receive one or more user selections of source data and an input defining one or more operations to be performed on the selected source data to generate processed data for display as a chart;
retrieve the source data from at least one data source;
process the source data according to the defined one or more operations to generate processed data for output for display as a chart;
store the chart in the data store as data defining the one or more operations and data identifying the source data operated on;
receive a further user selection to redisplay the chart;
retrieve the source data from the at least one data source; and
process the source data according to the defined one or more operations to generate the processed data for output for redisplay as the chart.

12. The system of example 11, wherein the program code includes program code for execution by the one or more processors to receive and store user input chart display range data, wherein in response to receiving the further user selection the processed data is generated for output for display using the stored user input chart display range data.

13. The system of example 12, wherein the program code includes program code for execution by the one or more processors to retrieve the source data from the at least one source is dependent upon the user input chart display range data.

14. The system of any one of examples 11 to 13, wherein the program code includes program code for execution by the one or more processors to store data defining a plurality of said operations, and output for display operation selections for the selection of the one or more operations, wherein the receiving of the input defining the one or more operations comprises receiving a selection of one or more of said operation selections.

15. The system of any one of examples 11 to 14, wherein the program code includes program code for execution by the one or more processors to:

receive a user selection of processed data displayed in one or more charts and an input defining one or more further operations to be performed on the selected processed data to generate further processed data for display as a further chart;

determine associated source data used in the determination of the further processed data, retrieve the associated source data from at least one data source;

process the associated source data according to the defined one or more operations and the one or more further operations to generate further processed data for output for display as the further chart; and store the further chart as data defining the one or more operations and the one or more further operations and data identifying the associated source data operated on.

16. The system of example 15, wherein the program code includes program code for execution by the one or more processors to:

receive another user selection to redisplay the further chart;

retrieve the associated source data from the at least one data source, and process the associated source data according to the defined one or more operations and the one or more further operations to generate the further processed data for output for redisplay.

17. The system of any one of examples 11 to 16, wherein the source data comprises a plurality of sets of source data, each user selection is of a plurality of sets of source data, and the at least one defined operation comprises operating on the selected sets of source data in combination to generate the new data.

18. The system of any one of examples 11 to 17, wherein the program code includes program code for execution by the one or more processors to store metadata on the source data, wherein the chart is stored to further include metadata on the processed data.

19. The system of any one of examples 11 to 18, wherein the source data is sequential data.

20. The system of any one of examples 11 to 19, wherein the retrieving of the source data from the at least one data source includes automatically receiving updated source data, and the program code includes program code for execution by the one or more processors to process the source data according to the defined one or more operations to generate the processed data for output for display by automatically updating the processed data according to the updated source data.

21. A non-transitory storage medium storing program code for execution by one or more processors to:

receive one or more user selections of source data and an input defining one or more operations to be performed on the selected source data to generate processed data for display as a chart;

retrieve the source data from at least one data source;

process the source data according to the defined one or more operations to generate processed data for output for display as a chart;

store the chart in the data store as data defining the one or more operations and data identifying the source data operated on;

receive a further user selection to redisplay the chart;

retrieve the source data from the at least one data source; and process the source data according to the defined one or more operations to generate the processed data for output for redisplay as the chart.

A system for processing data comprising:

one or more machines comprising one or more processors; and memory storing one or more programs for execution by the one or more processors to control the one or more processors to carry out the method of any one of the methods described above.

A carrier medium carrying machine readable code for controlling one or more processors of the machine to carry out the method of any one of the methods described above.

Extensions and Alternatives

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A system comprising:
one or more processors configured to execute program code to cause the system to:
cause display of a user interface comprising:
one or more selectable indications of algorithmic or mathematical operations; and
at least a first chart and a second chart, wherein regions of the first and second charts are interactively selectable by a user;
receive a first user input, via the user interface, selecting a region of the displayed first chart, wherein the first user input comprises a touch or pointer input to the displayed first chart to select the region of the displayed first chart;
in response to the first user input, retrieve first source data associated with the selected region of the displayed first chart;
receive a second user input, via the user interface, selecting a region of the displayed second chart, wherein the second user input comprises a touch or pointer input to the displayed second chart to select the region of the displayed second chart;
in response to the second user input, retrieve second source data associated with the selected region of the displayed second chart;
receive a third user input, via the user interface, selecting one or more algorithmic or mathematical operations, wherein the one or more algorithmic or mathematical operations are selected through a touch or pointer input to the user interface to select at least one of the one or more selectable indications of algorithmic or mathematical operations, and wherein the one or more algorithmic or mathematical operations comprise at least one operation to combine the retrieved first source data and the retrieved second source data;
in response to the third user input, process and combine the retrieved first source data and the retrieved second source data according to the one or more algorithmic or mathematical operations to generate third chart comprising a combination of the retrieved first source data and the retrieved second source data;

cause display, in the user interface, of the third chart; and store first information useable for regenerating the third chart, the first information identifying:
the first source data,
the second source data, and
the one or more algorithmic or mathematical operations.

2. The system of claim 1, wherein the region of the displayed first chart comprises a reduced range of data of the first chart as compared to a displayed range of data of the first chart.

3. The system of claim 2, wherein the first information identifying the first source data comprises an identification of the reduced range of data of the first chart.

4. The system of claim 1, wherein:
the one or more algorithmic or mathematical operations include two or more algorithmic or mathematical operations in a sequence; and
processing and combining the retrieved first source data and the retrieved second source data according to the one or more algorithmic or mathematical operations includes applying the two or more algorithmic or mathematical operations in the sequence to the retrieved first source data and the retrieved second source data to generate the third chart.

5. The system of claim 1, wherein the one or more processors are further configured to execute program code to cause the system to, in response to receiving a fourth user input to redisplay the third chart:
retrieve, based on the first information, the first source data;
retrieve, based on the first information, the second source data;
retrieve, based on the first information, the one or more algorithmic or mathematical operations;
apply the one or more algorithmic or mathematical operations to the retrieved first source data and the retrieved second source data to regenerate the third chart comprising a combination of the retrieved first source data and the retrieved second source data; and
cause redisplay of the third chart.

6. The system of claim 5, wherein the region of the displayed second chart comprises a subset of data of the second chart comprising a range of the second chart along at least one axis of the second chart.

7. The system of claim 5, wherein:
the one or more algorithmic or mathematical operations include two or more algorithmic or mathematical operations in a sequence; and
processing and combining the retrieved first source data and the retrieved second source data according to the one or more algorithmic or mathematical operations includes applying the two or more algorithmic or mathematical operations in the sequence to the retrieved first source data and the retrieved second source data to generate the third chart.

8. A computer-implemented method comprising:
by one or more processors executing program instructions:
causing display of a user interface comprising:
one or more selectable indications of algorithmic or mathematical operations; and
at least a first chart and a second chart, wherein regions of the first and second charts are interactively selectable by a user;
receiving a first user input, via the user interface, selecting a region of the displayed first chart, wherein the first user input comprises a touch or pointer input to the displayed first chart to select the region of the displayed first chart;
in response to the first user input, retrieving first source data associated with the selected region of the displayed first chart;
receiving a second user input, via the user interface, selecting a region of the displayed second chart, wherein the second user input comprises a touch or pointer input to the displayed second chart to select the region of the displayed second chart;
in response to the second user input, retrieving second source data associated with the selected region of the displayed second chart;
receiving a third user input, via the user interface, selecting one or more algorithmic or mathematical operations, wherein the one or more algorithmic or mathematical operations are selected through a touch or pointer input to the user interface to select at least one of the one or more selectable indications of algorithmic or mathematical operations, and wherein the one or more algorithmic or mathematical operations comprise at least one operation to combine the retrieved first source data and the retrieved second source data;
in response to the third user input, processing and combining the retrieved first source data and the retrieved second source data according to the one or more algorithmic or mathematical operations to generate third chart comprising a combination of the retrieved first source data and the retrieved second source data;
causing display, in the user interface, of the third chart; and
storing first information useable for regenerating the third chart, the first information identifying:
the first source data,
the second source data, and
the one or more algorithmic or mathematical operations.

9. The computer-implemented method of claim 8, wherein the region of the displayed first chart comprises a reduced range of data of the first chart as compared to a displayed range of data of the first chart.

10. The computer-implemented method of claim 9, wherein the first information identifying the first source data comprises an identification of the reduced range of data of the first chart.

11. The computer-implemented method of claim 8, wherein:
the one or more algorithmic or mathematical operations include two or more algorithmic or mathematical operations in a sequence; and
processing and combining the retrieved first source data and the retrieved second source data according to the one or more algorithmic or mathematical operations includes applying the two or more algorithmic or mathematical operations in the sequence to the retrieved first source data and the retrieved second source data to generate the third chart.

12. The computer-implemented method of claim 8 further comprising:
- by the one or more processors executing program instructions:
  - in response to receiving a fourth user input to redisplay the third chart:
    - retrieving, based on the first information, the first source data;
    - retrieving, based on the first information, the second source data;
    - retrieving, based on the first information, the one or more algorithmic or mathematical operations;
    - applying the one or more algorithmic or mathematical operations to the retrieved first source data and the retrieved second source data to regenerate the third chart comprising a combination of the retrieved first source data and the retrieved second source data; and
  - cause redisplaying of the third chart.

13. The computer-implemented method of claim 12, wherein the region of the displayed second chart comprises a subset of data of the second chart comprising a range of the second chart along at least one axis of the second chart.

14. The computer-implemented method of claim 12, wherein:
- the one or more algorithmic or mathematical operations include two or more algorithmic or mathematical operations in a sequence; and
- processing and combining the retrieved first source data and the retrieved second source data according to the one or more algorithmic or mathematical operations includes applying the two or more algorithmic or mathematical operations in the sequence to the retrieved first source data and the retrieved second source data to generate the third chart.

\* \* \* \* \*